US010878233B2

(12) United States Patent
Bender et al.

(10) Patent No.: US 10,878,233 B2
(45) Date of Patent: *Dec. 29, 2020

(54) ANALYZING TECHNICAL DOCUMENTS AGAINST KNOWN ART

(71) Applicant: International Business Machines Corporation, Armonk, NY (US)

(72) Inventors: Michael Bender, Rye Brook, NY (US); Joseph Celi, Boca Raton, FL (US); Gordan G. Greenlee, Endicott, NY (US); David Jaramillo, Lake Worth, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/352,208

(22) Filed: Mar. 13, 2019

(65) Prior Publication Data
US 2019/0205631 A1 Jul. 4, 2019

Related U.S. Application Data

(63) Continuation of application No. 15/401,148, filed on Jan. 9, 2017, now Pat. No. 10,282,603.

(51) Int. Cl.
*G06K 9/00* (2006.01)
*G06K 9/46* (2006.01)
*G06F 16/93* (2019.01)

(52) U.S. Cl.
CPC ......... *G06K 9/00442* (2013.01); *G06F 16/93* (2019.01); *G06K 9/00483* (2013.01); *G06K 9/4671* (2013.01)

(58) Field of Classification Search
CPC .......... G06K 9/00442; G06K 9/00483; G06K 9/4671; G06F 16/93
See application file for complete search history.

(56) References Cited

U.S. PATENT DOCUMENTS

| 6,026,388 A | 2/2000 | Liddy et al. |
| 6,943,923 B2 | 9/2005 | Charpentier |
| 8,010,397 B1 | 8/2011 | Chitanavong et al. |
| 8,266,519 B2 | 9/2012 | Verma et al. |
| 8,738,359 B2 * | 5/2014 | Gupta ..................... G06N 5/025 704/9 |
| 8,922,804 B2 | 12/2014 | Chang et al. |

(Continued)

OTHER PUBLICATIONS

Appendix P, "List of IBM Patents or Patent Applications Treated as Related", dated Mar. 27, 2020, 2 pages.

(Continued)

*Primary Examiner* — Qian Yang
(74) *Attorney, Agent, or Firm* — Michael A. Petrocelli; Maxine L. Barasch; Keohane & D'Alessandro, PLLC

(57) ABSTRACT

Embodiments of the present invention provide techniques for analyzing technical documents against known art. One or more machine learning classifiers are trained by a training set. References are ingested and assembled into a corpus. An input query is processed by natural language processing, and the classifiers are used to retrieve relevant documents and references, providing solutions to the input query. Anti-patterns are identified and provided to a user in the form of a report to alert the user to potential problems with the input query.

19 Claims, 17 Drawing Sheets

(56) References Cited

U.S. PATENT DOCUMENTS

| | | |
|---|---|---|
| 9,286,351 B2 | 3/2016 | Lundberg |
| 2007/0124166 A1 | 5/2007 | Van Luchene |
| 2007/0179776 A1* | 8/2007 | Segond ................. G06F 40/211 |
| | | 704/9 |
| 2008/0033741 A1 | 2/2008 | Van Luchene et al. |
| 2009/0132496 A1 | 5/2009 | Chen et al. |
| 2012/0016859 A1 | 1/2012 | Sears |
| 2014/0046947 A1 | 2/2014 | Jenkins et al. |
| 2014/0180677 A1* | 6/2014 | McCaffrey ............ G06F 40/289 |
| | | 704/9 |
| 2015/0081277 A1 | 3/2015 | Behi |
| 2015/0206069 A1 | 7/2015 | Beers et al. |
| 2015/0261755 A1 | 9/2015 | Steiert |
| 2016/0048936 A1* | 2/2016 | Perkowski ........... G06Q 50/184 |
| | | 705/310 |
| 2017/0103060 A1 | 4/2017 | Liang et al. |
| 2018/0060302 A1* | 3/2018 | Liang ..................... G06F 16/35 |
| 2018/0197001 A1 | 7/2018 | Bender et al. |

OTHER PUBLICATIONS

Qian Yang, USPTO Office Action, U.S. Appl. No. 15/401,148, Notification dated Aug. 28, 2018, 12 pages.

Qian Yang, USPTO Notice of Allowance and Fees Due, U.S. Appl. No. 15/401,148, dated Dec. 19, 2018, 9 pages.

* cited by examiner

ANALYZING TECHNICAL DOCUMENTS AGAINST KNOWN ART

CROSS-REFERENCE TO RELATED APPLICATIONS

The present patent document is a continuation of U.S. patent application Ser. No. 15/401,148, filed Jan. 9, 2017, entitled "ANALYZING TECHNICAL DOCUMENTS AGAINST KNOWN ART", the entire contents of which is incorporated herein by reference.

FIELD OF THE INVENTION

The present invention relates generally to information retrieval, and more particularly, to analyzing technical documents against known art.

BACKGROUND

Information retrieval is the process of obtaining relevant information from a collection of informational resources. It can provide results that enumerate multiple objects which can vary in the degree of relevancy to the query. A variety of algorithms exist to perform searches of data. A related field is that of data analytics. In recent years, so called "big data" projects have arisen, in which very large data sets may be analyzed computationally to reveal patterns, trends, and associations. However, shortcomings still remain, and information retrieval is often an inexact process. It is therefore desirable to have improvements in information retrieval.

SUMMARY

In one aspect, there is provided a computer-implemented method for analyzing technical documents against a corpus, comprising: receiving an input query comprising technical information; performing a computerized natural language analysis process to perform sentence classifications on sentences within the input query; identifying key technical points of the input query based on the sentence classifications; processing the corpus to identify one or more corpus documents that contain one or more key technical points of the input query; identifying one or more anti-patterns within the one or more corpus documents; generating a report, wherein the report includes an indication of the one or more anti-patterns, and a list of the one or more identified corpus documents.

In another aspect, there is provided a computer system comprising: a processor; a memory coupled to the processor, the memory containing instructions, that when executed by the processor, perform the steps of: receiving an input query comprising technical information; performing a computerized natural language analysis process to perform sentence classifications on sentences within the input query; identifying key technical points of the input query based on the sentence classifications; processing the corpus to identify one or more corpus documents that contain one or more key technical points of the input query; identifying one or more anti-patterns within the one or more corpus documents; generating a report, wherein the report includes an indication of the one or more anti-patterns, and a list of the one or more identified corpus documents.

In yet another aspect, there is provided a computer program product for analyzing technical documents against a corpus for an electronic computing device comprising a computer readable storage medium having program instructions embodied therewith, the program instructions executable by a processor to cause the electronic device to: receive an input query comprising technical information; perform a computerized natural language analysis process to perform sentence classifications on sentences within the input query; identify key technical points of the input query based on the sentence classifications; process the corpus to identify one or more corpus documents that contain one or more key technical points of the input query; identify one or more anti-patterns within the one or more corpus documents; generate a report, wherein the report includes an indication of the one or more anti-patterns, and a list of the one or more identified corpus documents.

BRIEF DESCRIPTION OF THE DRAWINGS

Features of the disclosed embodiments will be more readily understood from the following detailed description of the various aspects of the invention taken in conjunction with the accompanying drawings.

Figure 1:
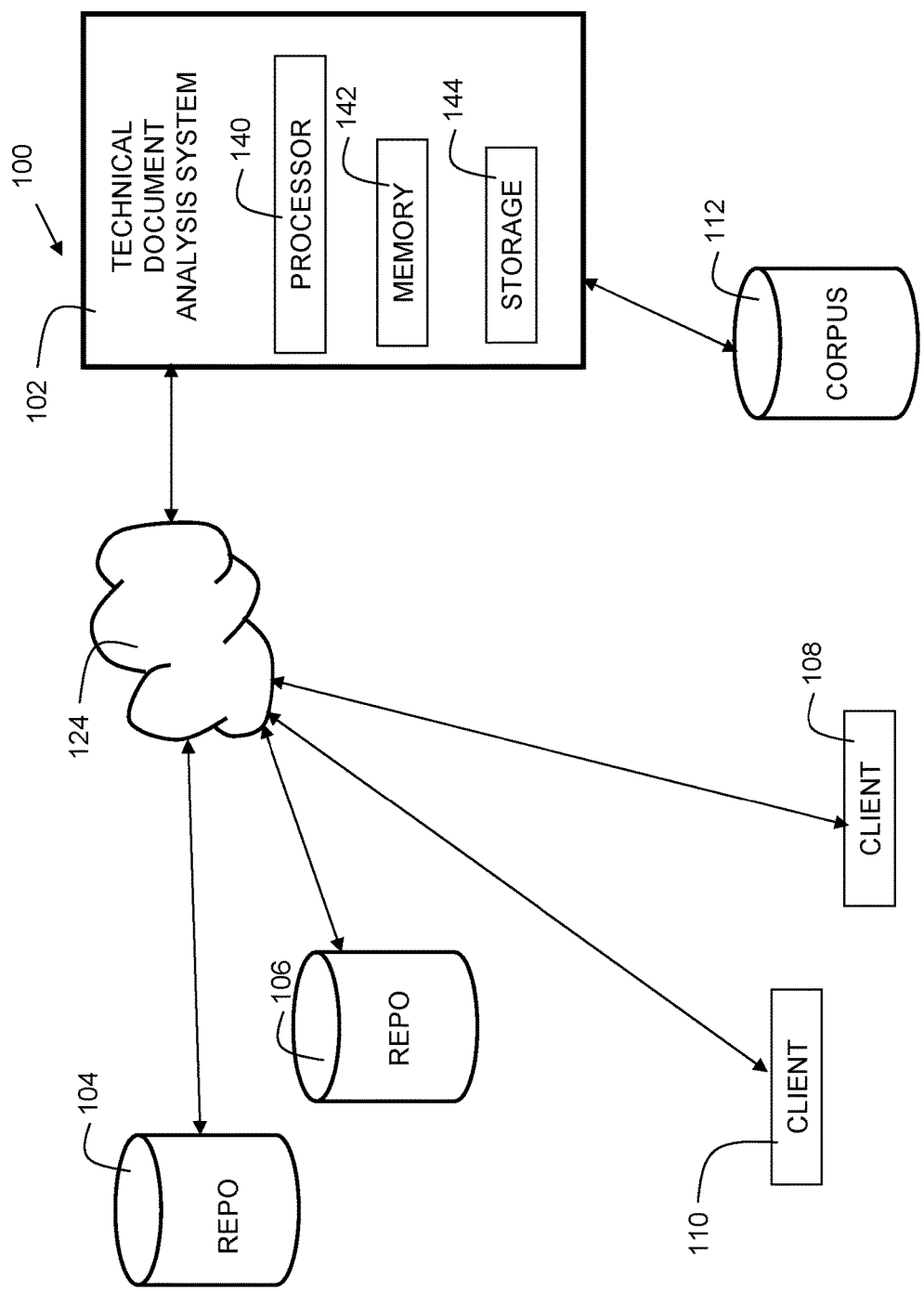
FIG. 1 is a system diagram in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Embodiments of the present invention provide techniques for analyzing technical documents against known art. One or more machine learning classifiers are trained by a training set. A plurality of references are assembled into a corpus. An input query is processed by natural language processing, and the classifiers are used to retrieve relevant documents and references. Anti-patterns are identified and provided to a user in the form of a report to alert the user to potential problems with the input query.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is a system diagram in accordance with embodiments of the present invention. System 100 comprises a technical document analysis system, which may be embodied in a computer 102, comprising a processor 140, a memory 142 coupled to the processor 140, and storage 144. The memory 142, contains instructions, that when executed by the processor 140, perform embodiments of the present invention. Memory 142 may include dynamic random access memory (DRAM), static random access memory (SRAM), magnetic storage, and/or a read only memory such as flash, EEPROM, optical storage, or other suitable memory. In some embodiments, the memory 142 may not be a transitory signal per se. In embodiments, storage 144 may include one or more magnetic storage devices such as hard disk drives (HDDs). Storage 144 may additionally include one or more solid state drives (SSDs). The computer 102 is configured to communicate with document repositories via network 124. In embodiments, network 124 may include the Internet. As shown in FIG. 1, two repositories, indicated as 104 and 106 are shown. In practice, there can be many more repositories. The repositories can include intellectual property databases, knowledge databases, text archives, image databases, video databases, indexes, and the like. The computer 102 can perform an ingestion service, continuously/periodically reading new information from the repositories. The repositories may be then processed and stored in a corpus 112. In embodiments, the corpus may be stored in a storage device on a local area network (LAN) for performance purposes. In some embodiments, the corpus may be stored within storage 144. In some embodiments, the corpus may be stored in network storage devices on a wide area network (WAN), and/or in cloud storage devices accessible by network 124.

The corpus may be stored in a variety of formats, including an indexing format, relational database, or other data structure. In embodiments, the corpus is stored in a Solr format such that the Solr full-text search feature can be used on the corpus. The corpus can be stored in additional or alternative formats. In some embodiments, the corpus is stored in a word-lemma-PoS (part of speech) format. The corpus may be annotated, stored in a treebank format, or other suitable format for natural language processing.

The system 100 can serve multiple clients, examples of which are indicated at 108 and 110. The clients may be computing devices that are in communication with computer 102 via network 124. Although two client devices are shown, in practice many more may be included. Users of the clients can submit an input query via the client device (108, or 110). In embodiments, the input query is submitted via, for example, an HTML user interface, rendered on the client device. The input query is then sent to the computer 102 via network 124. Protocols such as TCP/IP, UDP, SSH, and/or other suitable protocols may be used to establish communication between computer 102 and the client devices. Note that while FIG. 1 shows a single computer 102, in practice, the function of the technical document analysis computer can be distributed over multiple computing devices.

The technical document analysis computer 102 may perform processing on the input query received by the client device to extract entity and/or topic information from the input query. The entity and/or topic information is then used to search the corpus 112 for relevant documents. The listing of documents, along with additional information such as relevant passages and other warnings based on anti-pattern detection, is made available to the user in a report. The report provides a machine-learning based analysis of technical documents against known prior art, using anti-patterns. In embodiments, the report includes an indication of one or more anti-patterns and a list of one or more identified corpus documents.

Figure 2:
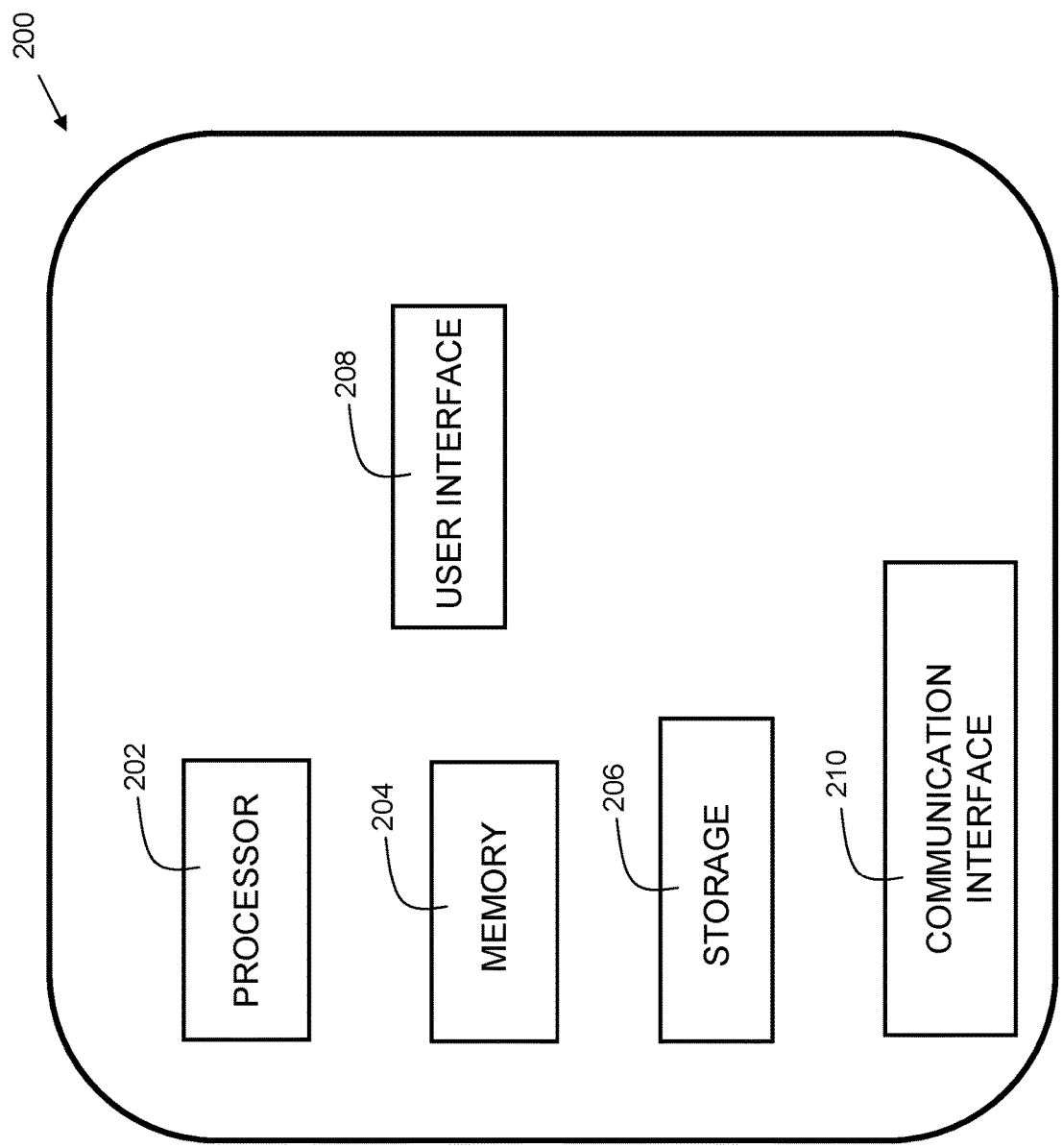
FIG. 2 is a block diagram of a device in accordance with embodiments of the present invention.

FIG. 2 is a block diagram of a technical document analysis computer device 200 in accordance with embodiments of the present invention. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se.

Device 200 further includes storage 206. In embodiments, storage 206 may include one or more magnetic storage devices such as hard disk drives (HDDs). Storage 206 may additionally include one or more solid state drives (SSDs).

The memory 204 and storage 206 together provide memory for multiple applications to execute on processor 202. In embodiments, device 200 may have multiple processors 202, and/or multiple cores per processor. The device 200 may execute an operating system that provides virtual memory management for the device 200. The processor 202 may have one or more cache memories therein. Memory 204 stores instructions, which when executed by the processor, implement the steps of the present invention.

Device 200 further includes a user interface 208, examples of which include a liquid crystal display (LCD), a plasma display, a cathode ray tube (CRT) display, a light emitting diode (LED) display, an organic LED (OLED) display, or other suitable display technology. The user interface 208 may further include a keyboard, mouse, or other suitable human interface device. In some embodiments, user interface 208 may be a touch screen, incorporating a capacitive or resistive touch screen in some embodiments.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. The client devices (108 and 110) of FIG. 1 may also be of a similar structure to device 200.

Figure 3:
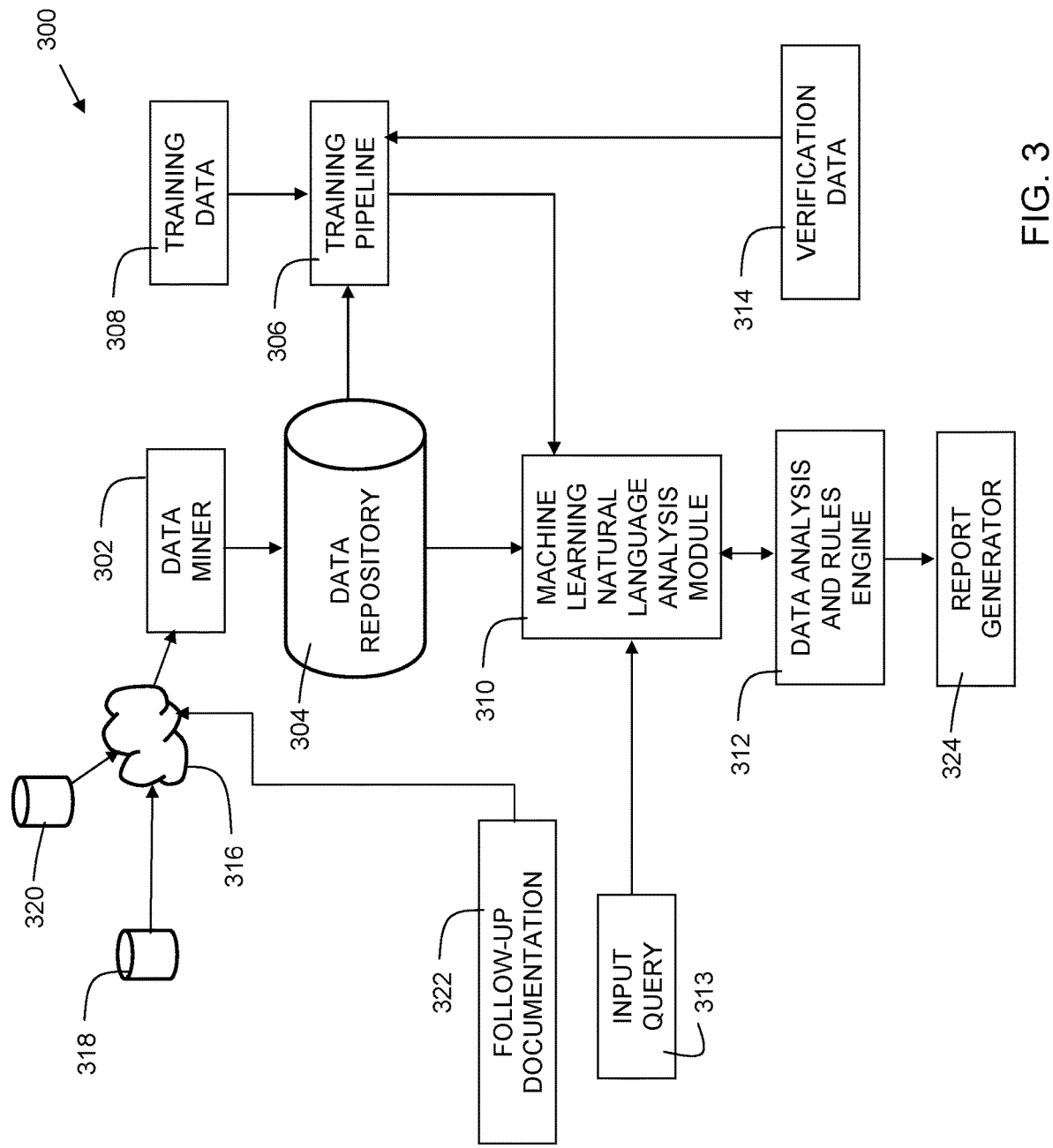
FIG. 3 is a block diagram indicating components of the present invention.

FIG. 3 is a block diagram indicating components of the present invention. Diagram 300 includes repositories 318 and 320, which are in communication with data miner 302 via network 316. In the example, network 316 includes the Internet. The data miner 302 performs content ingestion and enrichment on the data in the repositories 318 and 320. Note that while two repositories are shown in FIG. 3, in practice there can be many more repositories. The ingested data is processed and stored in a data repository 304. The processing can include, but is not limited to, indexing, concordance, stop word processing, bigram processing, dispersion analysis, lexical richness analysis (ratio of distinct words to total words), disambiguation, part-of-speech analysis, and/or anaphora resolution (the process of identifying what a pronoun or noun phrase refers to).

In embodiments, a subset of the data in the data repository 304 may be used as training data 308 and verification data 314 for one or more machine learning classifiers implemented in machine learning natural language analysis module 310. The classifiers may include, but are not limited to, decision trees, naive Bayes classifiers, Maximum Entropy classifiers, decision trees, and/or support vector machine classifiers. Thus, some embodiments include performing a computerized natural language analysis process by using a naive Bayes classifier. Some embodiments include performing a computerized natural language analysis process by using a support vector machine classifier.

The training data 308 is input to a training pipeline 306, and its output is compared with verification data 314. The classifiers may be adjusted until the verification data 314 is satisfactorily classified by the machine learning natural language analysis module 310. Once trained, an input query 313 can be input to the system and compared against the classified data from the data repository 304. The classified data from the machine learning natural language analysis module 310 is input to a data analysis and rules engine 312 which analyzes various patterns and anti-patterns in the data from the data repository. The input query 313 can include, but is not limited to, an innovation proposal (invention disclosure), a problem statement, a proposal, a contract, a requirements document, a patent, a patent application, or other technical document. References, relevant patterns and anti-patterns, and other information is compiled and presented by the report generator 324. Follow-up documentation 322 can be continuously/periodically input into the data repository. The follow-up documentation 322 can include updated information about a previously analyzed input query. For example, if an input query is a patent application, the follow-up documentation 322 can include prosecution history from a patent office (e.g., PAIR for the USPTO). Thus, as new information pertaining to the input query becomes available, a revised report can be rendered by report generator 324. Hence, in embodiments, the corpus includes patents and published patent applications, and methods further include updating the corpus with prosecution history of each published patent application.

Figure 4:
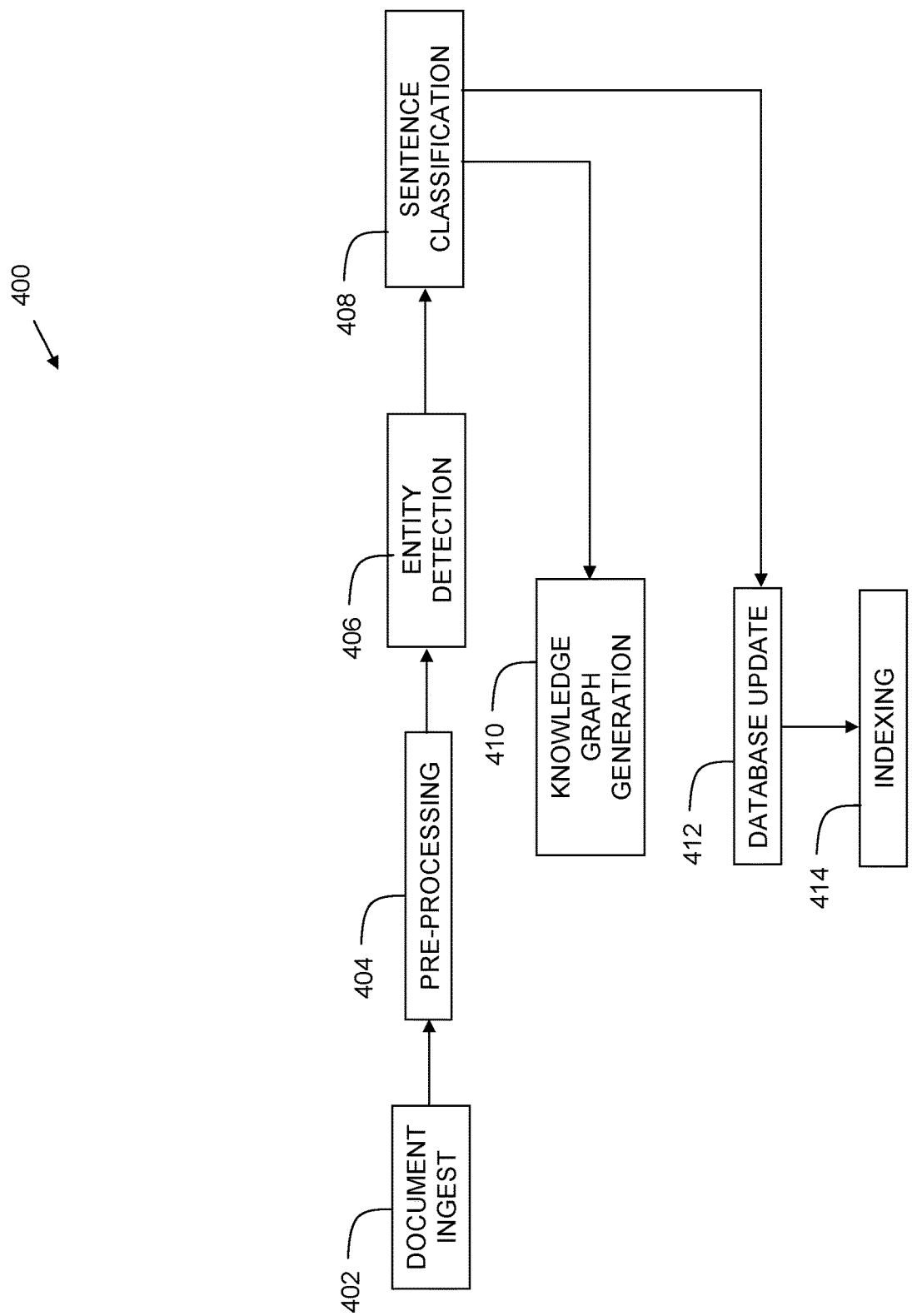
FIG. 4 is a diagram indicating a content ingestion and enrichment pipeline in accordance with embodiments of the present invention.

FIG. 4 is a diagram 400 indicating a content ingestion and enrichment pipeline in accordance with embodiments of the present invention. The document ingest 402 can include importing a corpus, raw text, and/or scraping of web pages. The ingested documents are then preprocessed at 404. The preprocessing can include, but is not limited to, tokenization, indexing, concordance, stop word processing, bigram processing, dispersion analysis, lexical richness analysis, disambiguation, part-of-speech analysis, and/or anaphora resolution. The process proceeds to entity detection 406. The entity detection can include noun identification, followed by identifying a subset of nouns including proper nouns, and nouns deemed to be topically pertinent. The process continues to sentence classification 408. The sentence classification can include identification of sentences, based on lexical patterns and/or punctuation. The sentences can then be classified into a variety of categories. In embodiments, one of the categories can be an obligation. The obligation may be identified by various words, lemmas, and/or phrases, including, but not limited to, "shall," "must," "have to," and/or "required." In embodiments, one of the categories can be a permission. The permission may be identified by various words, lemmas, and/or phrases, including, but not limited to, "may," "allowed to," "able to," and/or "permissible." In embodiments, one of the categories can be a prohibition. The prohibition may be identified by various words, lemmas, and/or phrases, including, but not limited to, "may not," "cannot," "shall not," and/or "prohibited." In embodiments, one of the categories can be a definition. The definition may be identified by various words, lemmas, and/or phrases, including, but not limited to, "referred to as," "known as," "is a," and/or "defined as." In embodiments, one of the categories can be a consequence. The consequence may be identified by various words, lemmas, and/or phrases, including, but not limited to, "causes," "results in," "triggers," and/or "outcome." In embodiments, one of the categories can be a condition. The condition may be identified by various words, lemmas, and/or phrases, including, but not limited to, an "if-\ then" construct, "in order to," and/or "prerequisite." In embodiments, one of the categories can be a patent claim. The claim may be identified by various words, lemmas, or phrases, including, but not limited to, starting with a number, having the phrase "of claim" in the sentence, and/or identifying a claims section of a document by a phrase such as "I claim," we claim," or "what is claimed is." In embodiments, one of the categories can be a rejection. The rejection may be identified by various words, lemmas, and/or phrases, including, but not limited to, "rejected," and/or legal codes pertaining to patent application rejection (e.g., 102, 103, and/or 112). In embodiments, one of the categories can be an objection. The objection may be identified by various words, lemmas, and/or phrases, including, but not limited to, "objected to."

The classified sentences are then input into the database via database update process 412. The data may further be indexed at process 414. Optionally, the sentence classification data may be used as an input for knowledge graph generation 410. The knowledge graph provides a representation of entity relationships. Entity relationships can include, but are not limited to, "is a kind of," "entails," "pertains to," "is a member of," "is a part of," "is an instance of," "causes," "is an opposite of," and others. In some embodiments, entities can have more than one entity relationship between them. Other entity relationships are possible.

Figure 5:
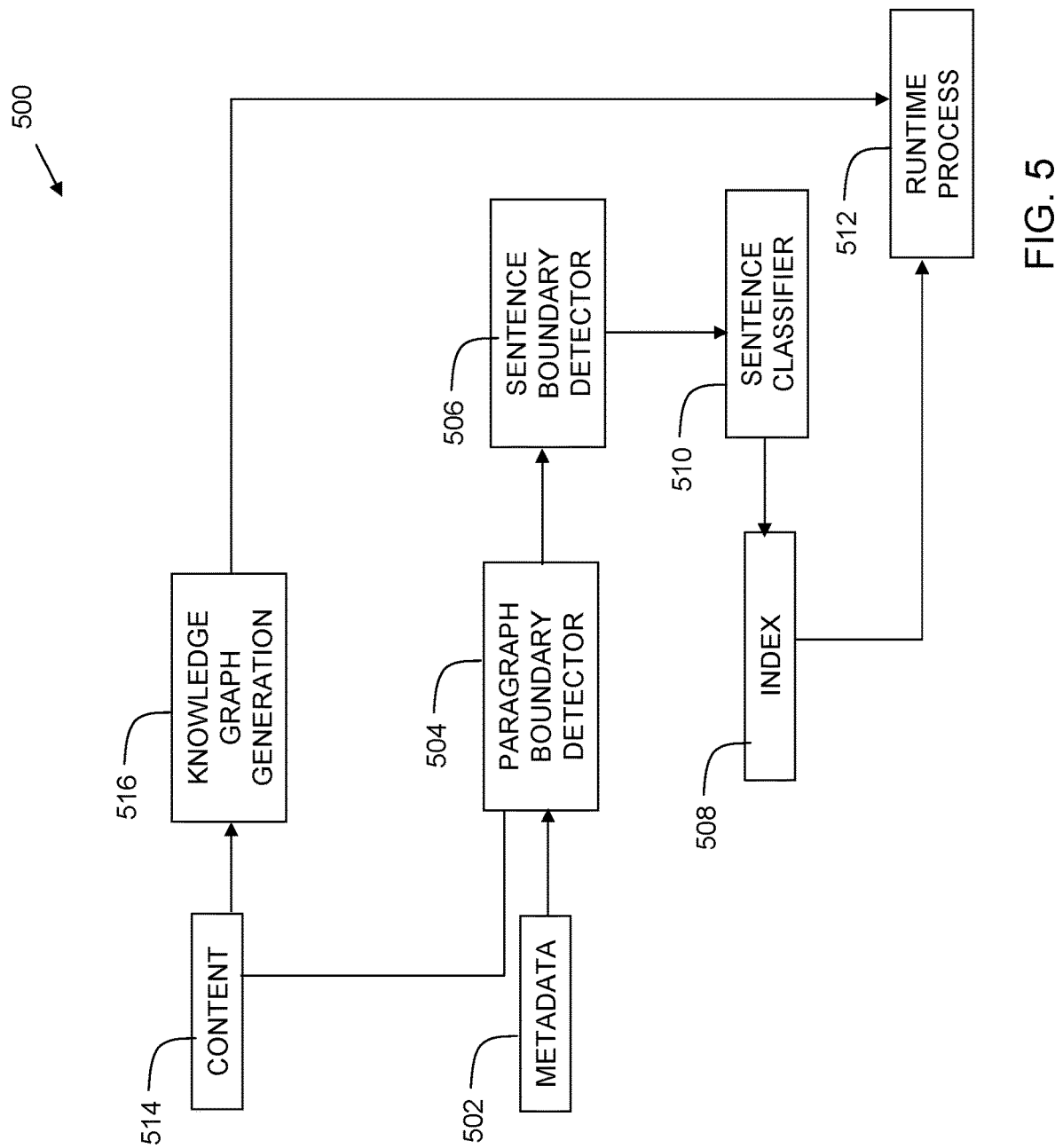
FIG. 5 is a diagram indicating details of an ingest process in accordance with embodiments of the present invention.

FIG. 5 is a diagram 500 indicating details of an ingest process in accordance with embodiments of the present invention. Content 514 may include an input query, or a document or body of text that is being added to a corpus. The content is input to a paragraph boundary detector 504. In embodiments, the paragraph boundary detector may use punctuation, indentation, or other syntax patterns to determine that a collection of sentences belongs to a paragraph. Each paragraph is then input to a sentence boundary detector 506. The sentence boundary detector may use punctuation or other syntax patterns to determine that a collection of words belongs to a sentence. The sentence is then input to sentence classifier 510. In embodiments, the sentence may be classified into one or more categories including, but not limited to, obligation permission, prohibition, definition, consequence, patent claim, rejection, objection, and condition. The classified sentence may then be input into an index 508. In embodiments, the index format may include, but is not limited to, suffix tree, inverted index, Ngram index, and/or a document-term matrix. Other index formats are possible. The index is then used as an input to a runtime process 512 which generates results based on an input query.

The content 514 may optionally be used as an input for knowledge graph generation 516. The knowledge graph generation may generate a diagram indicating entity relationships. The knowledge graph provides a representation of entity relationships. Entity relationships can include, but are not limited to, "is a kind of," "entails," "pertains to," "similar to," "is a member of," "is a part of," "is an instance of," "causes," "is an opposite of," and others. In some embodiments, entities can have more than one entity relationship between them. Other entity relationships are possible.

Optionally, metadata 502 pertaining to an input query or document may also be input into the paragraph boundary detector 504, followed by the sentence boundary detector 506, sentence classifier 510, and then to the index 508. The metadata may include, but is not limited to, author, publisher, assignee, date, location, title, genre, rating, parental rating, patent classification, topic tags, and/or other suitable metadata. The metadata can be used to generate additional entity relationships. For example, in an automated prior art search, references from the same inventor, assignee, and/or patent classification may be retrieved. Thus, in embodiments, performing a computerized natural language analysis process to derive sentence classifications on the input query comprises performing an entity detection process on the input query, performing a paragraph detection process on the input query, performing a sentence detection process, and categorizing each sentence in to one or more sentence categories.

Figure 6:
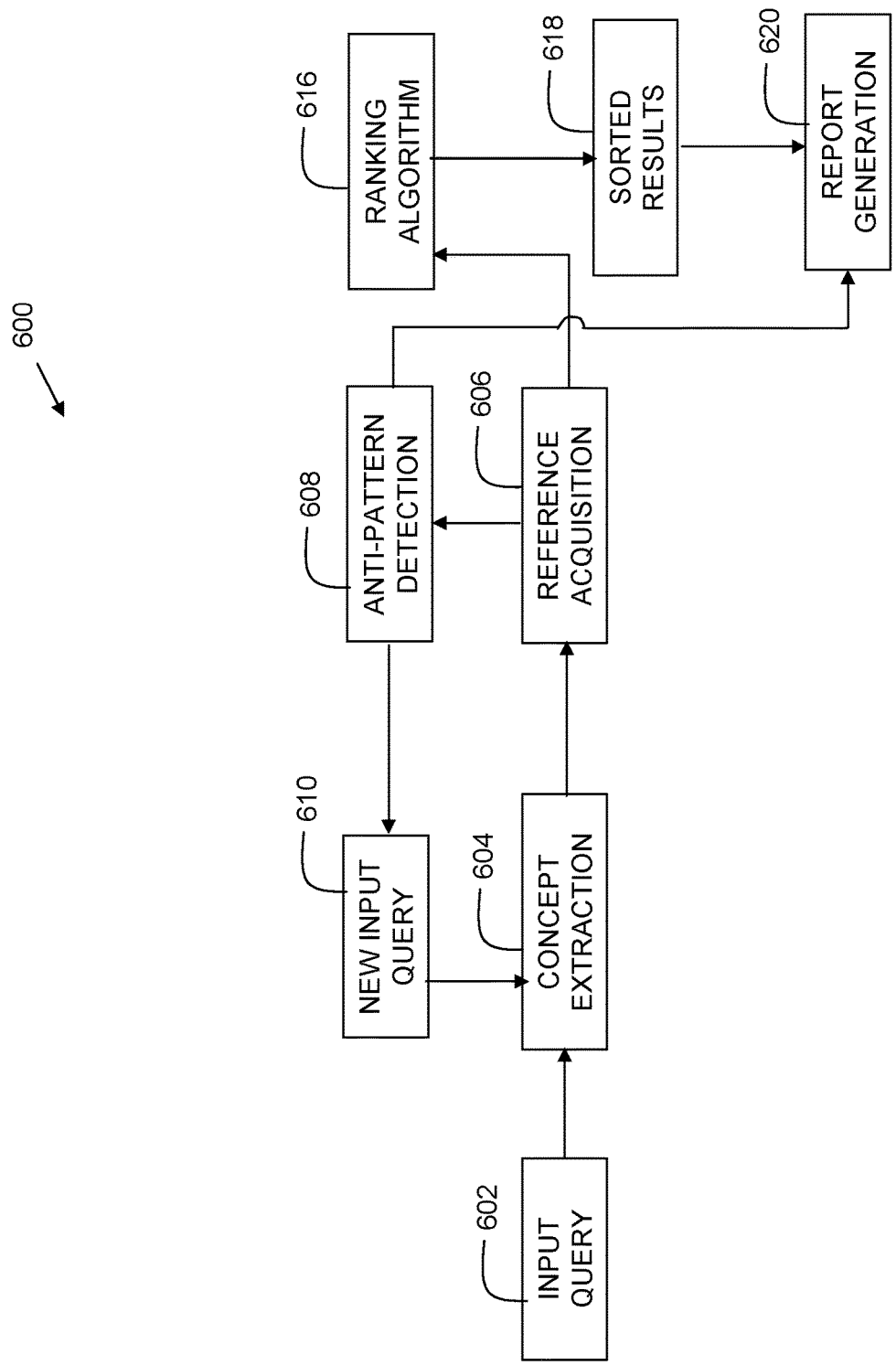
FIG. 6 is a diagram indicating details of a runtime process in accordance with embodiments of the present invention.

FIG. 6 is a diagram 600 indicating details of a runtime process in accordance with embodiments of the present invention. At 602, an input query is received. The input query can have a variety of forms. In embodiments, the input query can be an innovation proposal (invention disclosure). The results of the input query may include search results, and warnings based on anti-patterns and patterns within the input query and/or search results. The input query may also be a solution solicitation. An example of such may include "Find solutions for RAID storage at a remote location." The results of the input query may be one or more commercially available solutions and/or how-to articles. The input query may also include a contract, such as a real estate contract, or proposal. The results of the input query may include warnings based on anti-patterns.

At 604, the concept is extracted from the input query. The concept extraction may include entity detection, noun detection, and/or long word detection. In embodiments, words over a predetermined length may be used to characterize the input query. In some embodiments, the predetermined length may be twelve characters. Thus, embodiments include performing a computerized natural language analysis process to derive sentence classifications on the input query by performing a long word analysis. By filtering out shorter words, the remaining longer words may have more relevance to the subject matter of the text. The process continues to reference acquisition 606. References from the corpus and/or indexes can be searched to identify relevant references. The references can then be checked for anti-patterns at 608. In embodiments, the anti-patterns may be obtained by examining sentences classified as rejections or objections. In particular, in the case of analysis of an innovation proposal (invention disclosure), patents and patent applications of a similar topic are identified. Then, the prosecution (e.g., file wrapper) of each patent/patent application is searched for anti-patterns, including, but not limited to, sentences classified as rejections or objections. The entities of those sentences are extracted. The extracted entities from the anti-pattern detection may be used in the report generation 620 to indicate potential pitfalls in the application.

In some embodiments, the anti-pattern detection 608 can include detection of opposite entities of the input query 602. The opposite entities can then be used to form a new input query 610. The new input query can then also undergo concept extraction 604 and reference acquisition 606. The references may be processed by a ranking algorithm 616 to output sorted results 618. The ranking algorithm may generate a value score for each reference, where the value score is a mathematical measure of relevance. The sorted results are then input to the report generation 620. In embodiments, the ranking algorithm may utilize existing techniques for determining relevance, including, but not limited to, word count, synonym replacement, Levenshtein distance, or other suitable technique. This provides unique features such as advising a user of potential pitfalls or costly omissions in a document such as a patent application, contract, or request for proposals. Additionally, embodiments can provide an "electronic brainstorming" feature that can suggest additional areas of exploration for input queries such as an invention disclosure. Embodiments may include generating a new input query based on the suggestion, performing a computerized natural language analysis process to perform sentence classifications on sentences within the new input query, identifying key technical points of the new input query based on the sentence classifications, and processing the corpus to identify one or more corpus documents that contain one or more key technical points of the new input query. In embodiments, those documents may be ranked in order of relevance.

Figure 7:
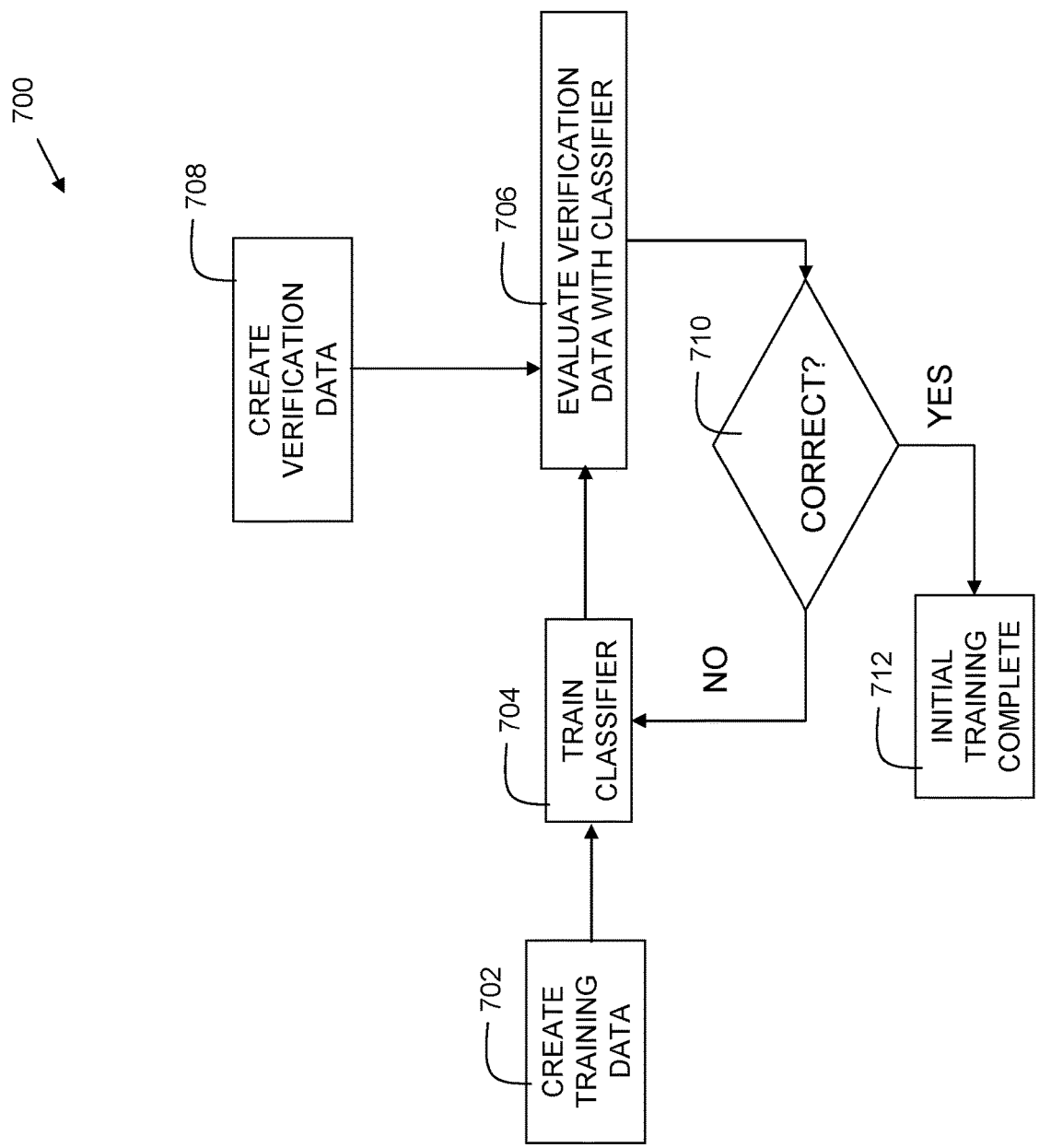
FIG. 7 is a diagram indicating details of a training process in accordance with embodiments of the present invention.

FIG. 7 is a diagram 700 indicating details of a training process in accordance with embodiments of the present invention. At 702, training data is created. In embodiments, the training data may be selected as a random subset of corpus data. In a supervised learning mode, the training data may be annotated and classified by human coders. Similarly, at 708, verification data may be obtained as a subset of corpus data. The verification data can be reviewed by human coders to determine an appropriate classification. The verification data 708 can be evaluated with the trained classifier at 706. A check is made at 710 to determine the verification data is correctly classified. This may include human verification of the verification data to determine that it was classified as expected. If yes, the initial training completes at 712. If no, the classifier may be adjusted and/or additional training may be performed until a satisfactory level of correct classification is determined at 710. In some embodiments, the satisfactory level of correct classification may range from 80 percent to 100 percent correct classification.

Figure 8:
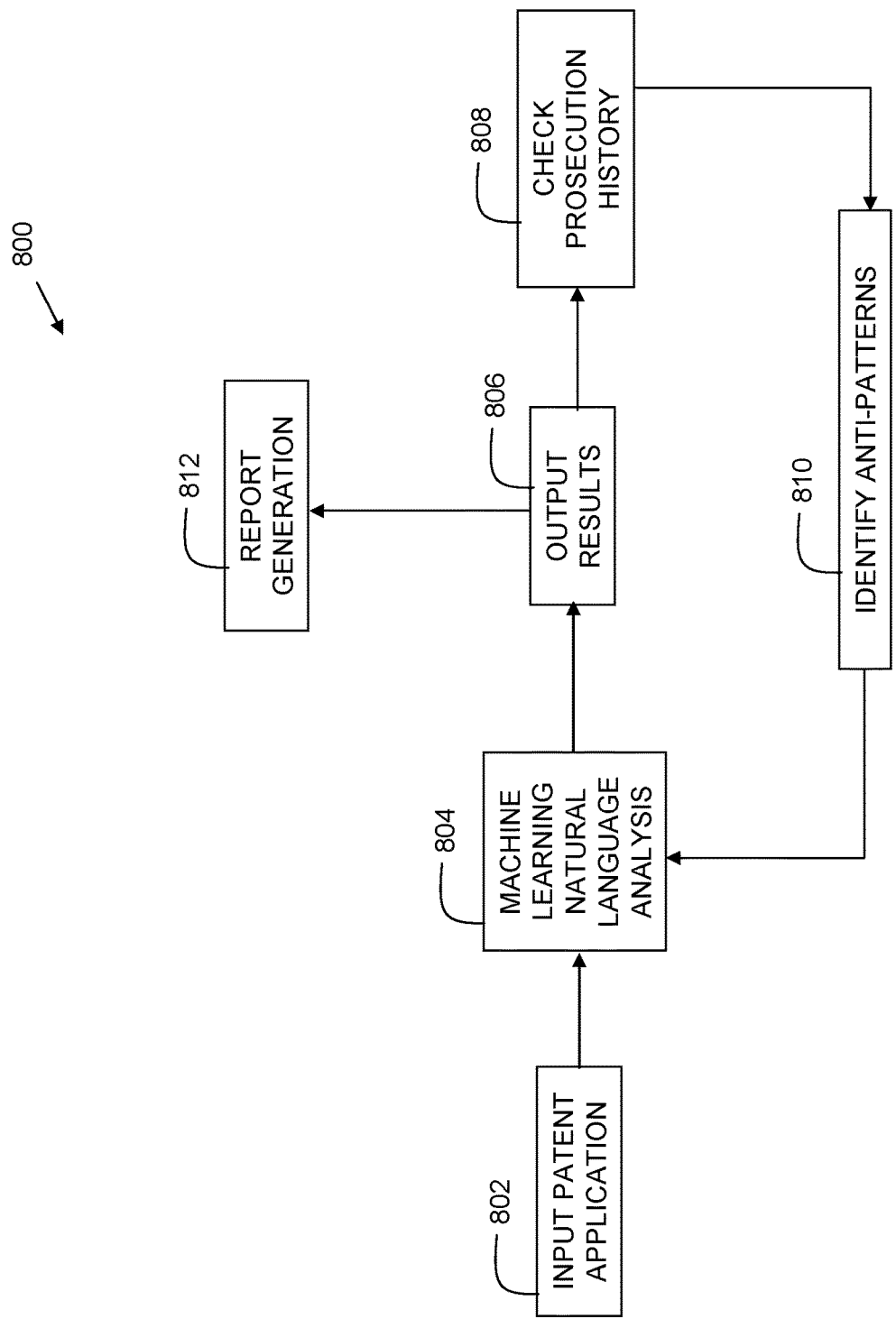
FIG. 8 is a diagram indicating details of a process utilizing anti-patterns in accordance with embodiments of the present invention.

FIG. 8 is a diagram 800 indicating details of a process utilizing anti-patterns in accordance with embodiments of the present invention. The embodiment illustrated in diagram 800 is particularly well suited for patent applications. In embodiments, prior to filing a patent application, the completed text is input at 802. A machine learning natural language analysis is performed at 804. The results are output at 806, and can be included into a report at 812. As part of a continuous learning process, the prosecution history is periodically checked at 808. This can involve processing the file wrapper (e.g., from PAIR from the USPTO). The processing of PAIR data can include, but is not limited to, optical character recognition (OCR), indexing, concordance, stop word processing, bigram processing, dispersion analysis, lexical richness analysis (ratio of distinct words to total words), disambiguation, part-of-speech analysis, and/or anaphora resolution. At 810, anti-patterns are identified within the prosecution history. The identification of anti-patterns can include classifying sentences of the prosecution history into various classifications including objection and rejection. The anti-patterns may be used to indicate potential pitfalls in the input patent application. For example, when the absence of a particular phrase or sentence is involved in a rejection, the absent phrase/sentence is fed back to the machine learning natural language analysis 804. It may be stored and/or indexed, such that when patent applications of a similar subject are input, relevant existing anti-patterns can be presented to a user in the form of a report. In this example, it can suggest/remind the user to include the phrase whose absence caused a rejection.

Figure 9:
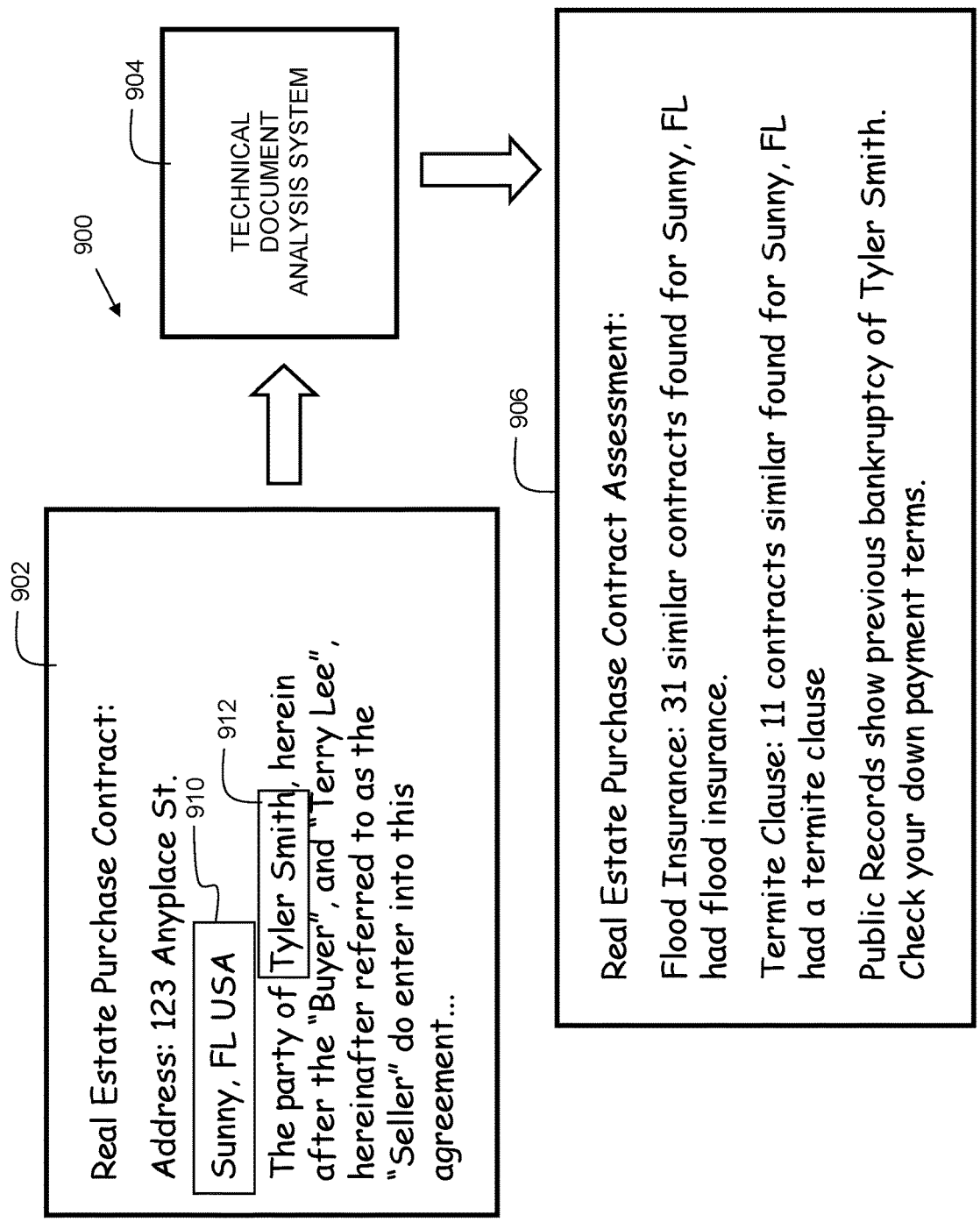
FIG. 9 shows an exemplary output of a contract analysis in accordance with embodiments of the present invention.

FIG. 9 shows an exemplary output of a contract analysis 900 in accordance with embodiments of the present invention. At 902, an exemplary excerpt of an input query in the form of a contract is input to a technical document analysis system 904 in accordance with embodiments of the present invention. Entities within the input query are identified, such as a location 910, and a name 912. Known techniques for entity detection may be used for this process. These may include grammar-based techniques, statistical models, and/or annotated training data. The technical document analysis system 904, using techniques described in this disclosure, identifies the input query as a real estate contract. A corpus of existing real estate contracts for real estate in the area identified by location 910 is searched. Clauses in other contracts that are not present in the input query are identified. Additionally, anti-patterns are checked, and items such as public record of a bankruptcy pertaining to the name 912 may be included in output report 906. In this way, the writer of the contract can review the suggestions of the output report 906 and make any needed revisions before submission of the contract.

Figure 10:
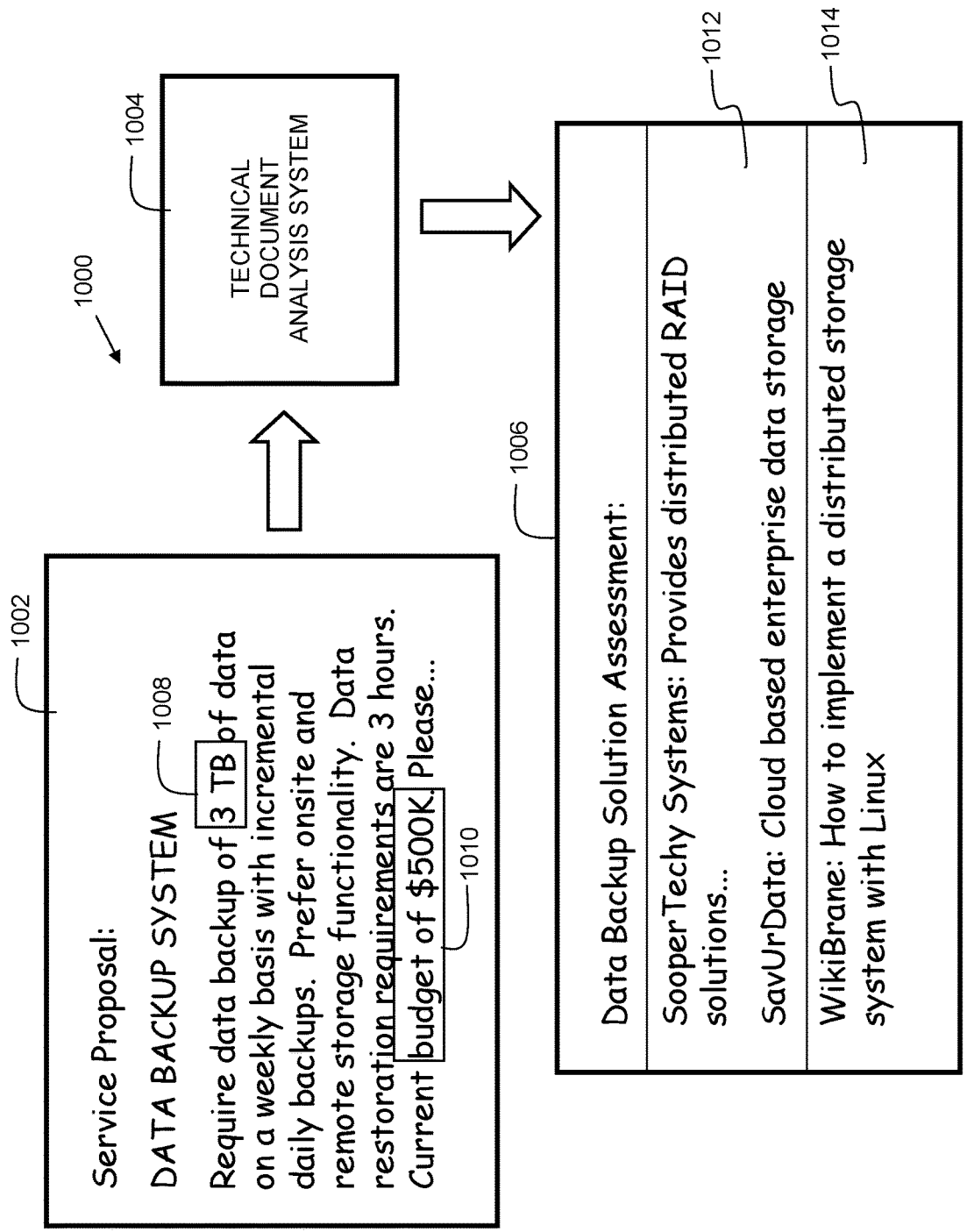
FIG. 10 shows an exemplary output of a technical problem analysis in accordance with embodiments of the present invention.

FIG. 10 shows an exemplary output of a technical problem analysis 1000 in accordance with embodiments of the present invention. At 1002, an exemplary excerpt of an input query in the form of a solution request is input to a technical document analysis system 1004 in accordance with embodiments of the present invention. A topic of the input query is identified based on a computer-implemented natural language analysis process. In this example, the input query is a request for a data storage solution. Entities within the input query are identified, such as a data size 1008, and a budget 1010. The entity identification may include grammar-based techniques, statistical models, and/or annotated training data. The technical document analysis system 1004, using techniques described in this disclosure, identifies the input query as a solution request. A corpus of existing commercial solutions and how-to documents in the subject area of the input query is searched. Relevant commercial solutions are identified, and shown in output report 1006 at 1012. Additionally, how-to documents are checked, and relevant how-to documents may be included in output report 1006 at 1014. In this way, a user of the technical document analysis system 1004 can retrieve potential commercially available solutions and/or techniques for implementation of a solution.

Figure 11:
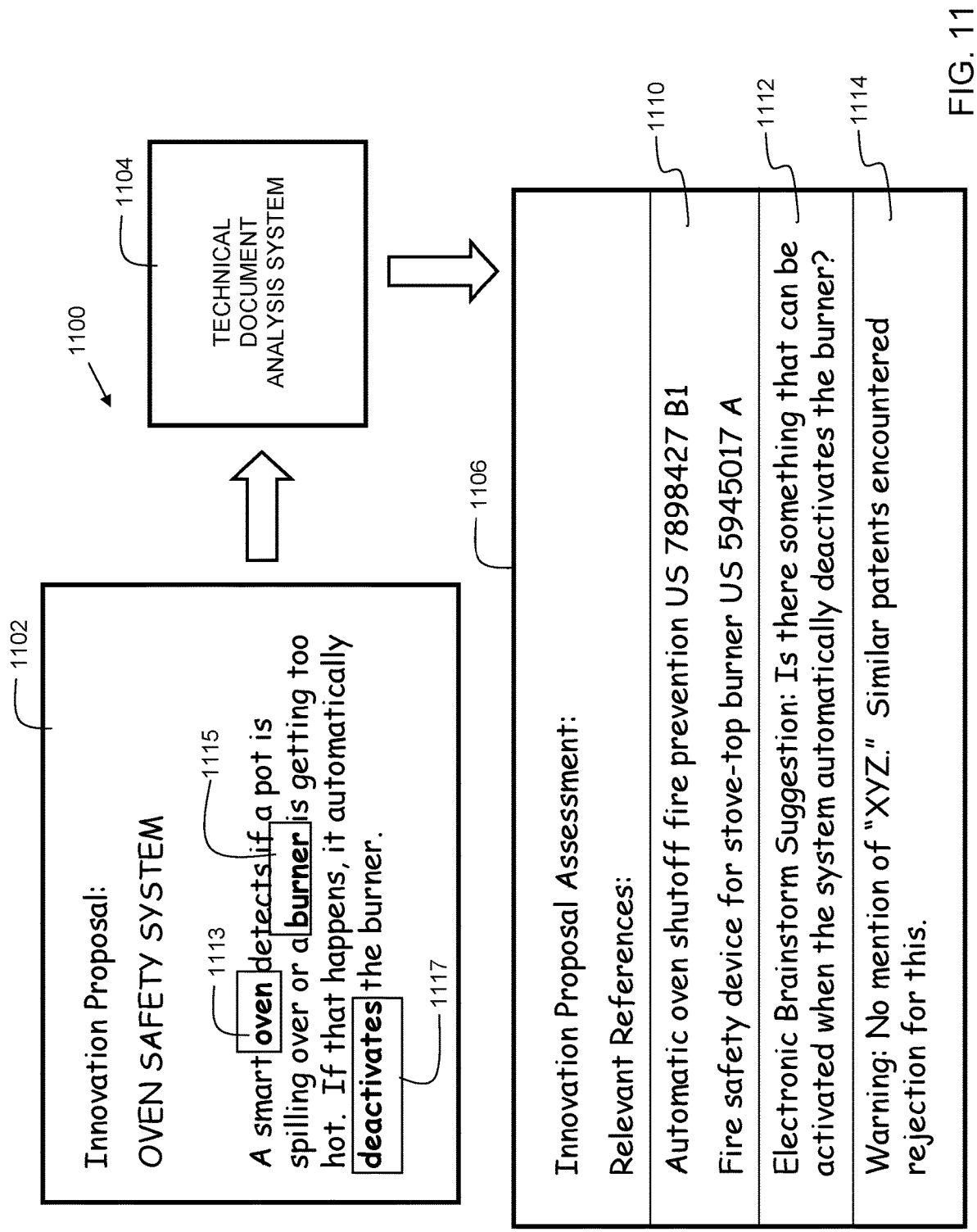
FIG. 11 shows an exemplary output of an innovation proposal analysis in accordance with embodiments of the present invention.

FIG. 11 shows an exemplary output of an innovation proposal analysis 1100 in accordance with embodiments of the present invention. At 1102, an exemplary excerpt of an input query in the form of an innovation proposal (invention disclosure) is input to a technical document analysis system 1104 in accordance with embodiments of the present invention. Entities within the input query are identified, such as a topical nouns 1113 and 1115, and an action 1117. In embodiments, the entity identification may include grammar-based techniques, statistical models, and/or annotated training data. The technical document analysis system 1104, using techniques described in this disclosure, identifies the input query as an invention disclosure pertaining to an oven safety system involving deactivation. A corpus of existing documents and references pertaining to oven safety systems is searched. Relevant references are identified and displayed in the output report 1106 at 1110. Additionally, opposite actions are checked, and suggestions pertaining to the opposite action are indicated in the output report 1106 at 1112 as an electronic brainstorm suggestion. In some embodiments, a new input query can be generated based on the electronic brainstorm suggestion 1112, and additional references pertaining to the new input query can be obtained, as indicated in 600 with new input query 610 (see FIG. 6). In this example, based on the identified action 1117, the technical document analysis system 1104 suggests investigation of an opposite action. Thus, since the input query proposes deactivation of the burner, the electronic brainstorm suggestion at 1112 suggests activating something. For example, an alarm can be activated when the burner is deactivated. Thus, embodiments include identifying an opposing entity for at least one technical point and where generating a report comprises indicating a suggestion based on the opposing entity. Additionally, anti-patterns based on prosecution history of similar references can be processed to provide an omission warning in the output report 1106 at 1114. In this example, the technical document analysis system 1104 determines that similar patent applications have encountered a rejection for not including "XYZ," and thus, a warning of that is displayed at 1114, allowing the user to take corrective action prior to filing a patent application for this innovation proposal.

Figure 12:
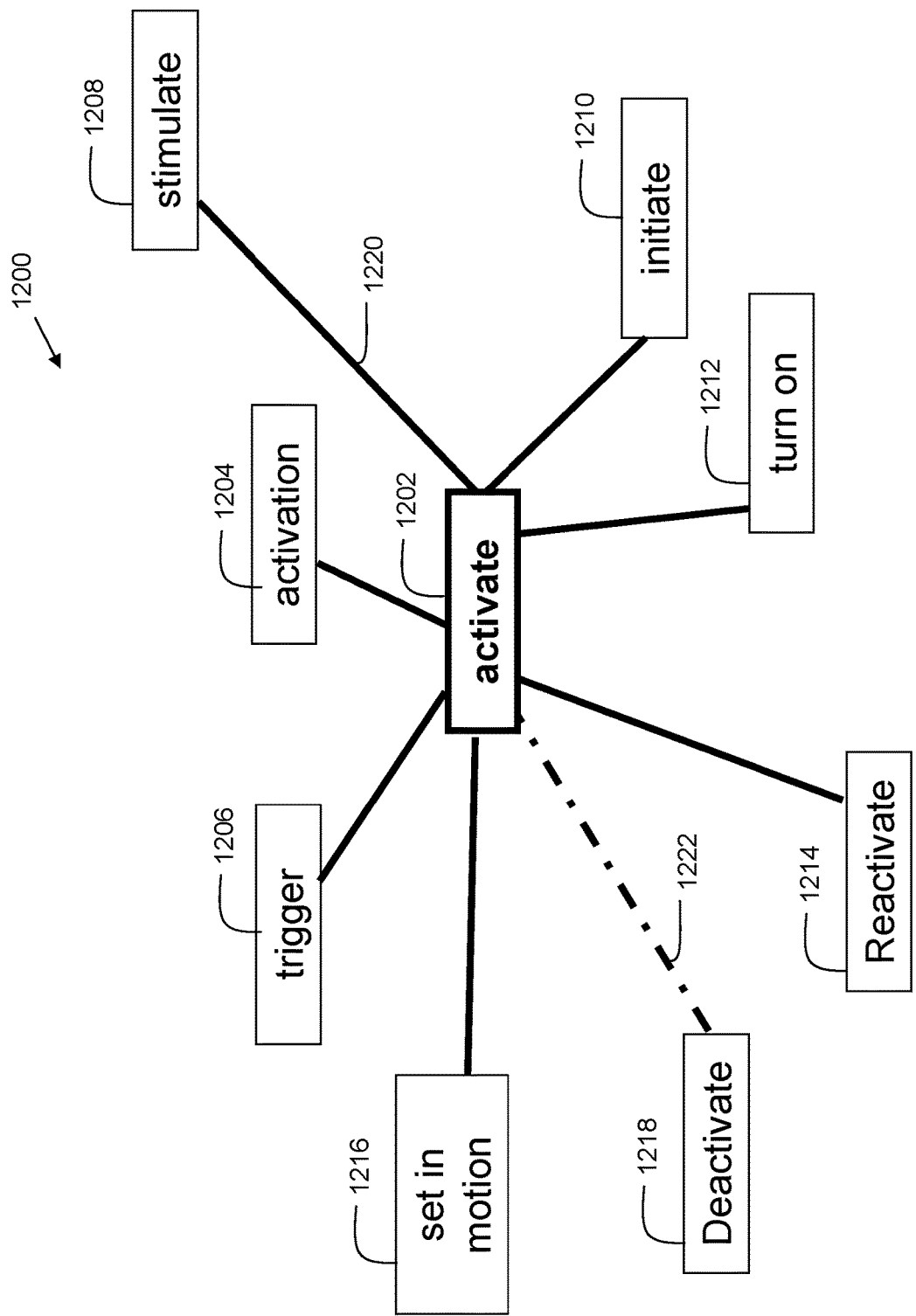
FIG. 12 is a visualization of word relationships in accordance with embodiments of the present invention.

FIG. 12 is a visualization 1200 of word relationships in accordance with embodiments of the present invention. The central word 1202 can be an entity, action, or other token from an input query or corpus. In this example, the central word is "activate." Multiple related words (1204, 1206, 1208, 1210, 1212, 1214, 1218, and 1216) are shown connected to the central word. The related words can be synonyms, antonyms, or can have another relationship to the central word, including, but not limited to, "is a kind of," "entails," "pertains to," "is a member of," "is a part of," "is an instance of," "causes," "is an opposite of," and others. The connection rendering can be indicative of the relationship. In the example of FIG. 12, the connection indicated as 1220 of a solid line is indicative of a synonym, whereas the connection indicated as 1222 of a dotted line is indicated as an antonym. Embodiments of the present invention may utilize antonyms as part of the electronic brainstorm suggestions. For example, referring again to FIG. 11, the entry 1112 is suggesting something pertaining to "activation" based on an item 1117 in the input query of "deactivation."

Figure 13:
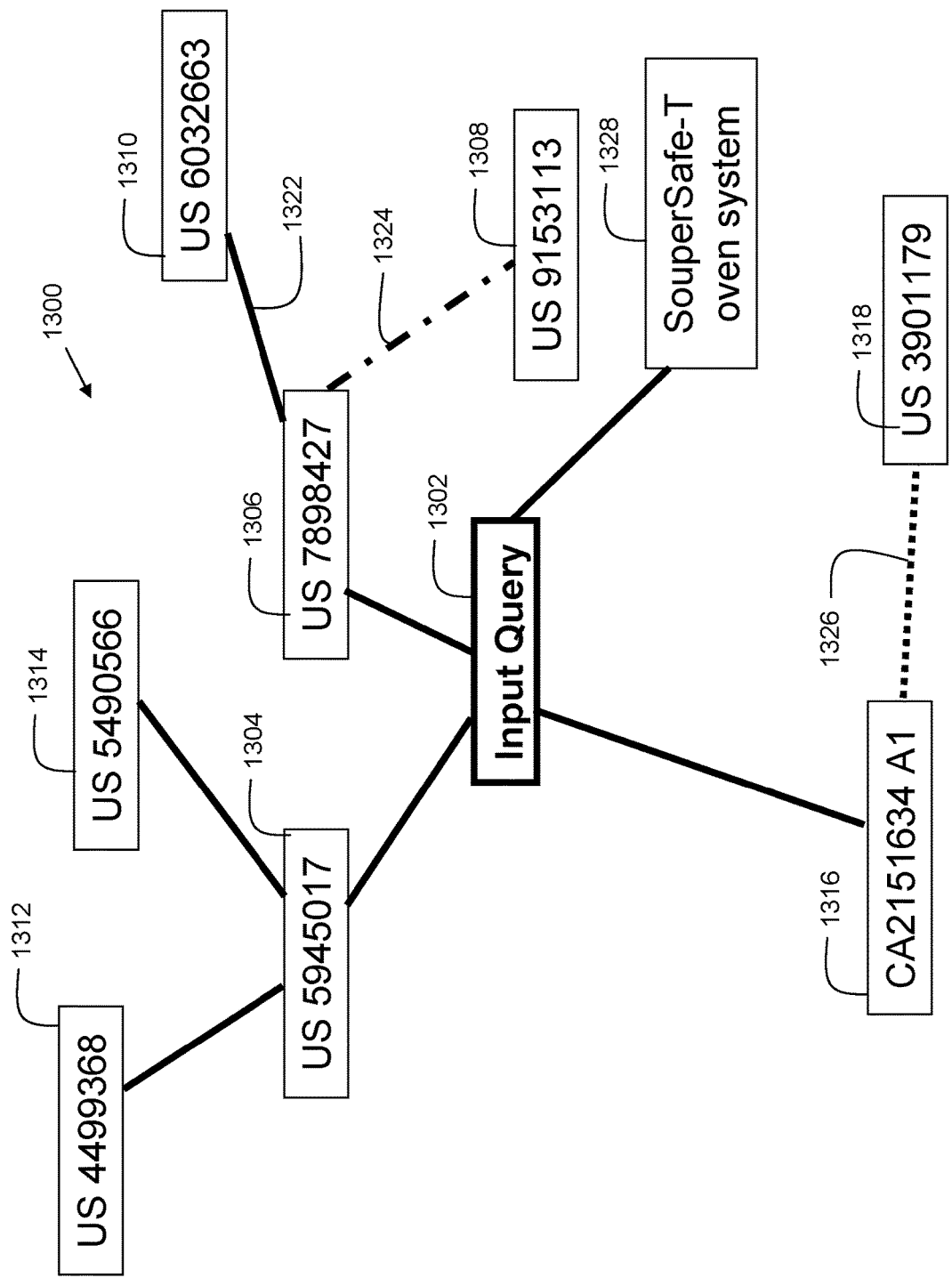
FIG. 13 is a visualization of reference relationships in accordance with embodiments of the present invention.

FIG. 13 is a visualization 1300 of reference relationships in accordance with embodiments of the present invention. In embodiments, the visualization can be a knowledge graph. As indicated in 1300, the central icon 1302 represents an input query. A plurality of related documents are shown, indicated as 1304, 1306, 1312, 1314, 1310, 1308, 1328, 1316, and 1318. Document 1318 represents a 2-hop reference since it is related to a 1-hop (direct relation) reference 1316. While two levels are illustrated in FIG. 13, in general, the visualization/knowledge graph can be n-hops, where n can be greater than two. Different types of relationships can be represented in the visualization 1300. For example, a topical relation can be indicated by a solid connection such as 1322. A metadata relation (e.g., common author, common assignee, etc.) can be indicated by the dotted line 1324, and another relation (e.g. "uses") can be indicated by the dotted line 1326. Multiple types of relationships can be represented by the visualization 1300.

In embodiments, the visualization 1300 is presented to the user in an interactive format, such as rendered with HTML, Java, JavaScript, and/or other suitable technology to present interactivity. When a user selects one of the related documents, they can obtain additional information about that document such as relevant passages, additional metadata, or other information. In some cases, the references may be prior art patents and patent applications. In other embodiments, the references may be non-patent literature (NPL), such as, for example, document 1328. In this way, a user can quickly see relationships between an input query such as an invention disclosure, and potential prior art. Thus, embodiments include generating a visual reference graph for the input query.

Figure 14:
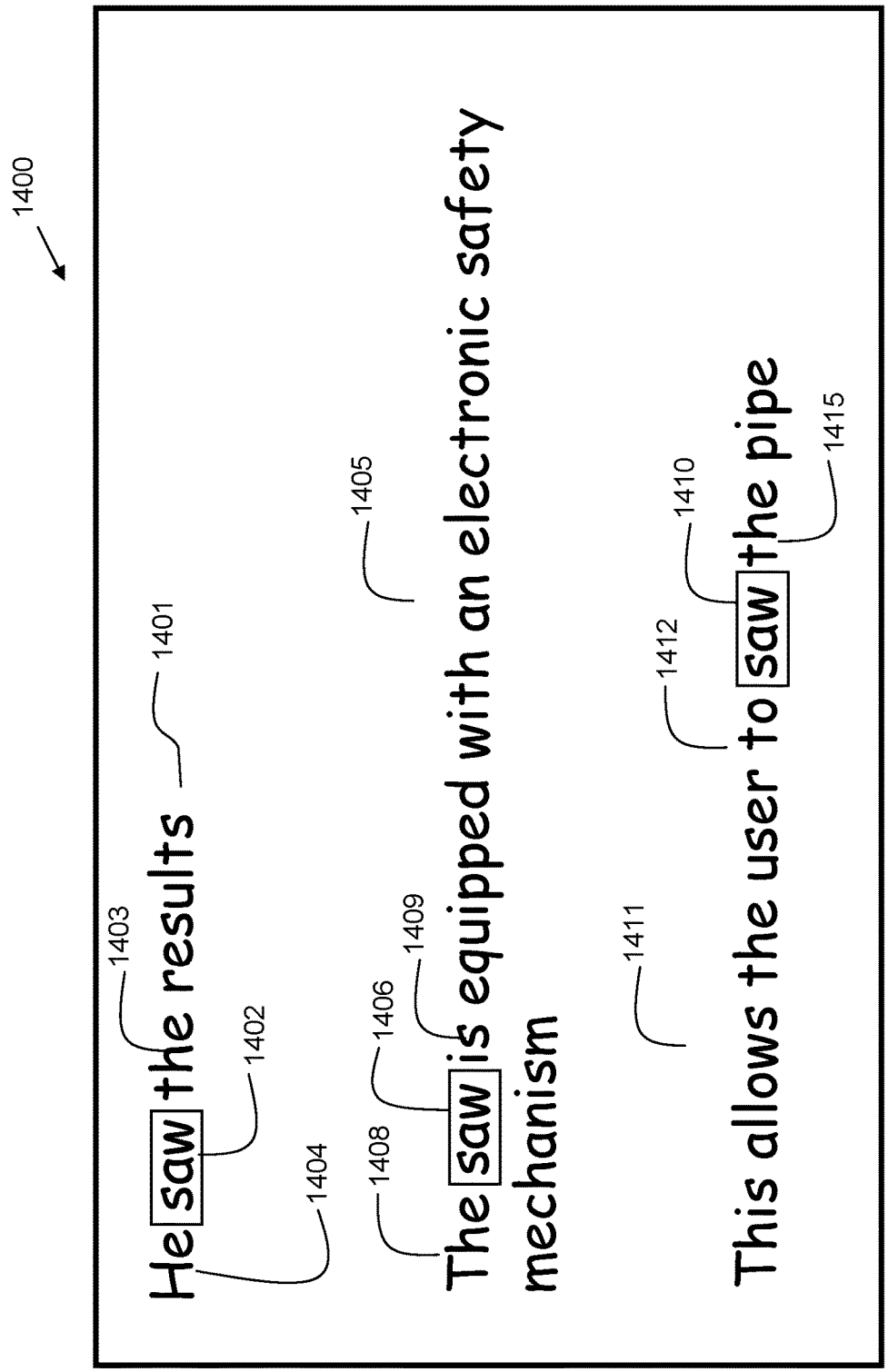
FIG. 14 shows an example of disambiguation in accordance with embodiments of the present invention.

FIG. 14 shows an example 1400 of disambiguation in accordance with embodiments of the present invention. Disambiguation is one of the processes that may be utilized in embodiments of the present invention. As part of content ingest, text may be tokenized into words and tagged with parts of speech. For some words, there can be more than one meaning and/or part of speech. FIG. 14 shows a disambiguation example with the word "saw." In phrase 1401, the word "saw" 1402 is a past tense verb. In embodiments, a machine learning natural language analysis module may identify the prior token 1404 to the word "saw" as a pronoun, and the following token 1403 as an article. In training a classifier, the pattern of pronoun-token-article may be associated with a verb, and thus the token is interpreted as a verb.

In phrase 1405, the word "saw" 1406 is a noun for a cutting tool. In embodiments, a machine learning natural language analysis module may identify the prior token 1408 to the word saw as an article, and the following token 1409 as a verb. In training a classifier, the pattern article-token-verb may be associated with a noun, and thus the token is interpreted as a noun.

In phrase 1411, the word "saw" 1410 is a noun for a cutting tool. In embodiments, a machine learning natural language analysis module may identify the prior token 1412 to the word "saw" as part of an infinitive form, and the following token 1415 as an article. In training a classifier, the pattern "to"-token-article may be associated with a verb, and thus the token is interpreted as a verb. These classifiers and techniques for disambiguation are examples, and other classifiers and techniques are possible. Thus, embodiments include performing a computerized natural language analysis process to derive sentence classifications on the input query by performing a disambiguation process.

Figure 15:
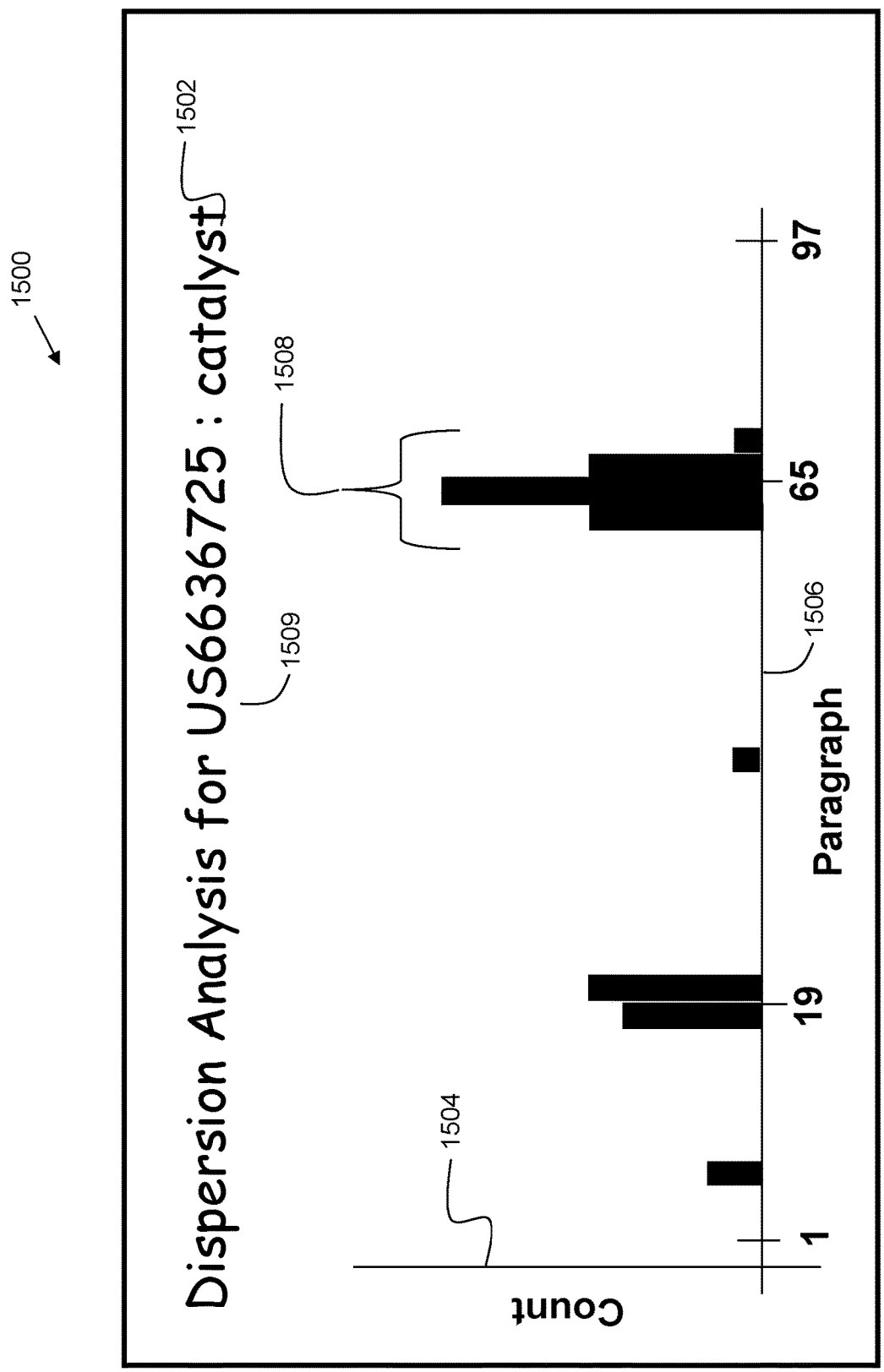
FIG. 15 shows an example of a dispersion analysis in accordance with embodiments of the present invention.

FIG. 15 shows an example 1500 of a dispersion analysis in accordance with embodiments of the present invention. In a multiple paragraph document (by the name at) 1509, a particular word may have a non-uniform distribution within the document. In the example 1500, a dispersion analysis is performed for the word "catalyst" 1502 within a sample document. A graph comprises a horizontal axis 1506 representing a paragraph number within document 1509, and a vertical axis 1504 representing a number of occurrences of word 1502 in document 1509. As can be seen in the graph, the presence of the word 1502 is concentrated in certain paragraphs. A maximum concentration 1508 is identified in the area around paragraph 65. In embodiments, paragraphs in proximity to the maximum concentration of the dispersion analysis are presented in a report of relevant references. Thus, in this example, if the input query contains the word "catalyst," and document U.S. Pat. No. 6,636,725 is deemed relevant, then passages from paragraphs at or near paragraph 65 may be retrieved for use in the output report. Thus, embodiments include performing a computerized natural language analysis process to derive sentence classifications on the input query by performing a dispersion analysis.

Figure 16:
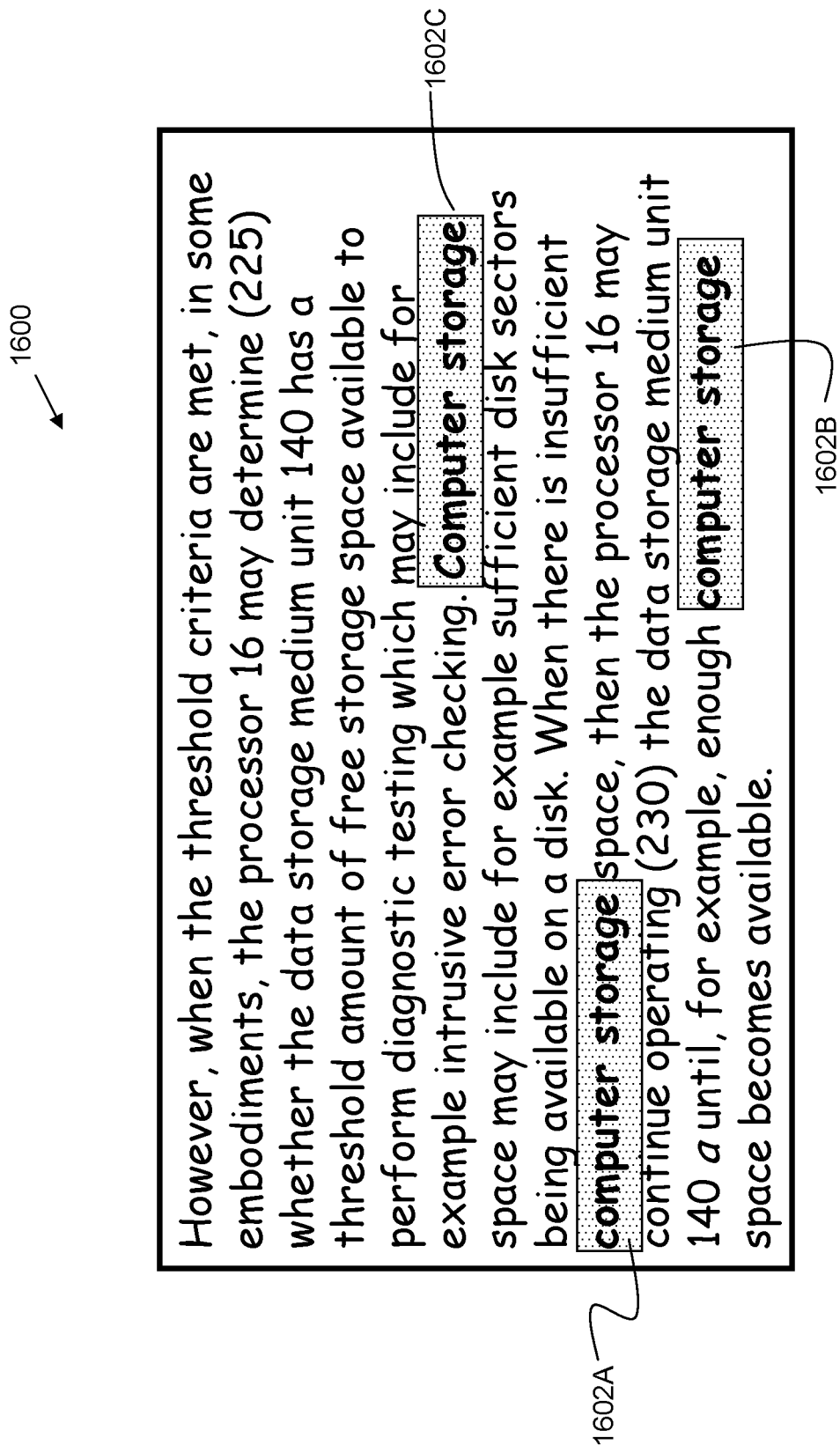
FIG. 16 shows an example of a bigram analysis in accordance with embodiments of the present invention.

FIG. 16 shows an example 1600 of a bigram analysis in accordance with embodiments of the present invention. In a bigram analysis, a pair of words in a particular order may be searched within a body of text of an input query and/or a corpus. In this example, the bigram "computer storage" is searched within a text excerpt. Three occurrences, indicated as 1602A, 1602B, and 1602C are present in the text passage. In embodiments, the usage of bigrams, trigrams, or more generally, n-grams (number=n), may be used to improve relevance in searching a corpus and/or processing an input query. Thus, embodiments include performing a computerized natural language analysis process to derive sentence classifications on the input query by performing a bigram analysis.

Figure 17:
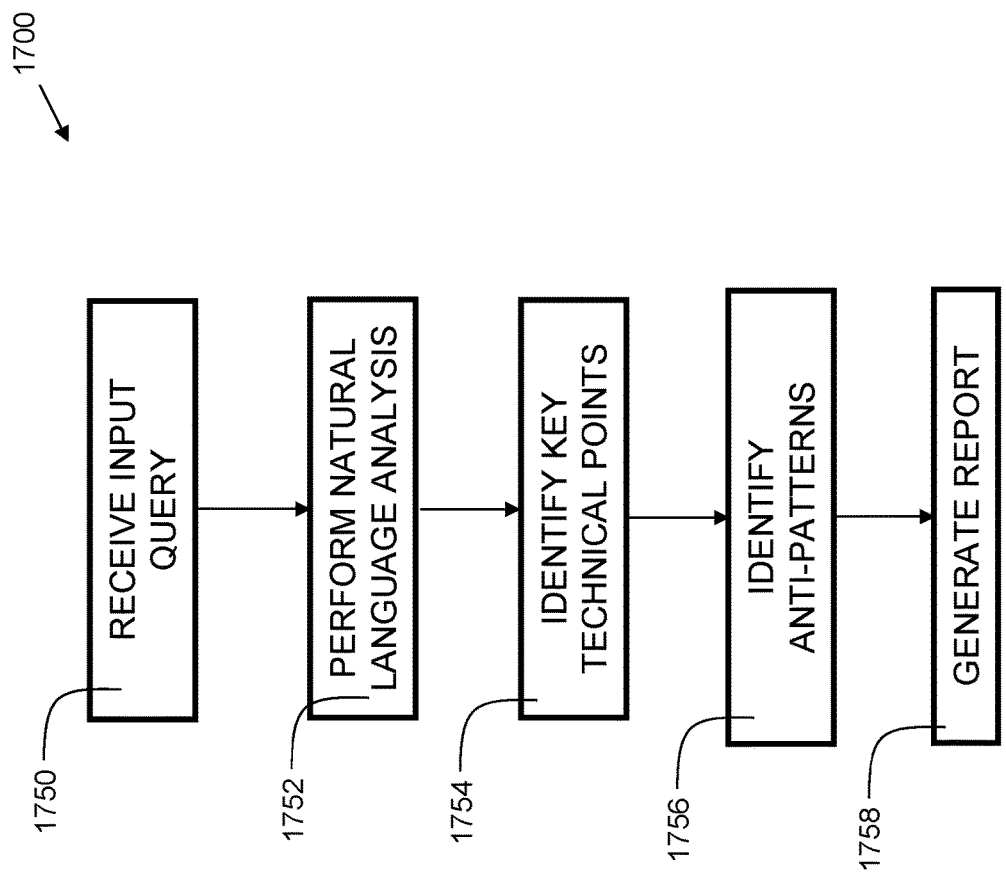
FIG. 17 is a flowchart indicating process steps in accordance with embodiments of the present invention.

FIG. 17 is a flowchart 1700 indicating process steps in accordance with embodiments of the present invention. In process step 1750, an input query is received. The input query may include, but is not limited to, a contract, an invention disclosure, a patent, a patent application, a requirements specification, a user manual, a design document, and/or a white paper. In process step 1752, a natural language analysis is performed by a computer. The natural language analysis process can include, but is not limited to, indexing, concordance, stop word processing, bigram processing, dispersion analysis, lexical richness analysis (ratio of distinct words to total words), disambiguation, part-of-speech analysis, and/or anaphora resolution. Additionally, the natural language analysis process can include the use of trained classifiers, including, but not limited to, decision trees, naive Bayes classifiers, Maximum Entropy classifiers, decision trees, and/or support vector machines. In process step 1754, key technical points are derived. This may include, but is not limited to, performing a data enrichment process, which may include noun identification, long word analysis, and/or disambiguation, among others. In process step 1756, one or more anti-patterns are identified. In embodiments, the identification of anti-patterns utilizes sentences classified as rejections and/or objections. In process step 1758, a report is generated. The report may include relevant references, anti-patterns, electronic brainstorming suggestions, and/or visualizations.

As can now be appreciated, embodiments of the present invention provide improvements in information retrieval. Using machine learning techniques, anti-patterns are used to generate warnings in documents such as patent applications, contracts, and the like. Electronic brainstorming suggestions use word relationships to provide additional suggestions for ideas and proposals. Thus, embodiments provide a powerful tool for research and development of new ideas. Furthermore, while the examples presented in this disclosure are in English, other natural languages may be used with embodiments of the present invention. These languages include, but are not limited to, Spanish, French, Italian, German, Russian, Polish, Finnish, Portuguese, Chinese, Japanese, and Korean, to name a few.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Additionally, packages like Python and/or Lucene may also be used. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method comprising:
   receiving an input query comprising technical information;
   identifying one or more corpus documents that contain one or more key technical points of the input query;
   identifying one or more anti-patterns within the one or more corpus documents;
   generating a report, wherein the report includes an indication of the one or more anti-patterns, wherein the report comprises a suggestion including an opposing entity for at least one key technical point of the one or more key technical points, wherein the opposing entity comprises an antonym of the at least one key technical point;
   generating a new input query based on the suggestion;
   performing a computerized natural language analysis process to perform sentence classifications on sentences within the new input query;
   identifying key technical points of the new input query based on the sentence classifications; and
   processing the corpus to identify one or more corpus documents that contain one or more key technical points of the new input query.

2. The method of claim 1, further comprising performing a computerized natural language analysis process to derive sentence classifications on the input query, wherein the computerized natural language process comprises:

performing an entity detection process on the input query;
performing a paragraph detection process on the input query;
performing a sentence detection process; and
categorizing each sentence in to one or more sentence categories.

3. The method of claim 2, wherein the one or more sentence categories include obligation, permission, prohibition, definition, consequence, and condition.

4. The method of claim 3, wherein the one or more sentence categories further includes a patent claim.

5. The method of claim 2, wherein the performing the computerized natural language analysis process to derive sentence classifications on the input query further comprises performing a disambiguation process.

6. The method of claim 2, wherein the performing the computerized natural language analysis process to derive sentence classifications on the input query further comprises performing a long word analysis.

7. The method of claim 2, wherein the performing the computerized natural language analysis process to derive sentence classifications on the input query further comprises performing a dispersion analysis.

8. The method of claim 2, wherein the performing the computerized natural language analysis process to derive sentence classifications on the input query further comprises performing a bigram analysis.

9. The method of claim 1, wherein the corpus includes patents and published patent applications, and further comprising updating the corpus with prosecution history of each published patent application.

10. The method of claim 1, further comprising identifying the opposing entity for the at least one key technical point.

11. The method of claim 1, further comprising ranking the one or more corpus documents that contain one or more key technical points of the new input query.

12. The method of claim 1, wherein generating the report comprises generating a visual reference graph for the input query.

13. The method of claim 1, wherein the input query comprises an invention disclosure.

14. The method of claim 1, wherein the input query comprises a contract.

15. The method of claim 1, wherein the input query comprises a requirements document.

16. The method of claim 1, wherein the performing the computerized natural language analysis process comprises using a naive Bayes classifier.

17. The method of claim 1, wherein the performing the computerized natural language analysis process comprises using a support vector machine classifier.

18. A computer system comprising:
a processor;
a memory coupled to the processor, the memory containing instructions, that when executed by the processor, perform the steps of:
receiving an input query comprising technical information;
identifying one or more corpus documents that contain one or more key technical points of the input query;
identifying one or more anti-patterns within the one or more corpus documents;
generating a report, wherein the report includes an indication of the one or more anti-patterns, wherein the report comprises a suggestion including an opposing entity for at least one key technical point of the one or more key technical points, wherein the opposing entity comprises an antonym of the at least one key technical point;
generating a new input query based on the suggestion;
performing a computerized natural language analysis process to perform sentence classifications on sentences within the new input query;
identifying key technical points of the new input query based on the sentence classifications; and
processing the corpus to identify one or more corpus documents that contain one or more key technical points of the new input query.

19. A computer program product comprising a computer readable storage medium having program instructions embodied therewith, the program instructions executable by a processor to cause the electronic device to:
receive an input query comprising technical information;
identify one or more corpus documents that contain one or more key technical points of the input query;
identify one or more anti-patterns within the one or more corpus documents;
generate a report, wherein the report includes an indication of the one or more anti-patterns, wherein the report comprises a suggestion including an opposing entity for at least one key technical point of the one or more key technical points, wherein the opposing entity comprises an antonym of the at least one key technical point;
generate a new input query based on the suggestion;
perform a computerized natural language analysis process to perform sentence classifications on sentences within the new input query;
identify key technical points of the new input query based on the sentence classifications; and
process the corpus to identify one or more corpus documents that contain one or more key technical points of the new input query.

* * * * *